June 21, 1966 A. RUSCH, JR., ET AL 3,257,500
FLAT ELECTRICALLY CONDUCTIVE FLEXIBLE CABLE
Filed June 3, 1964
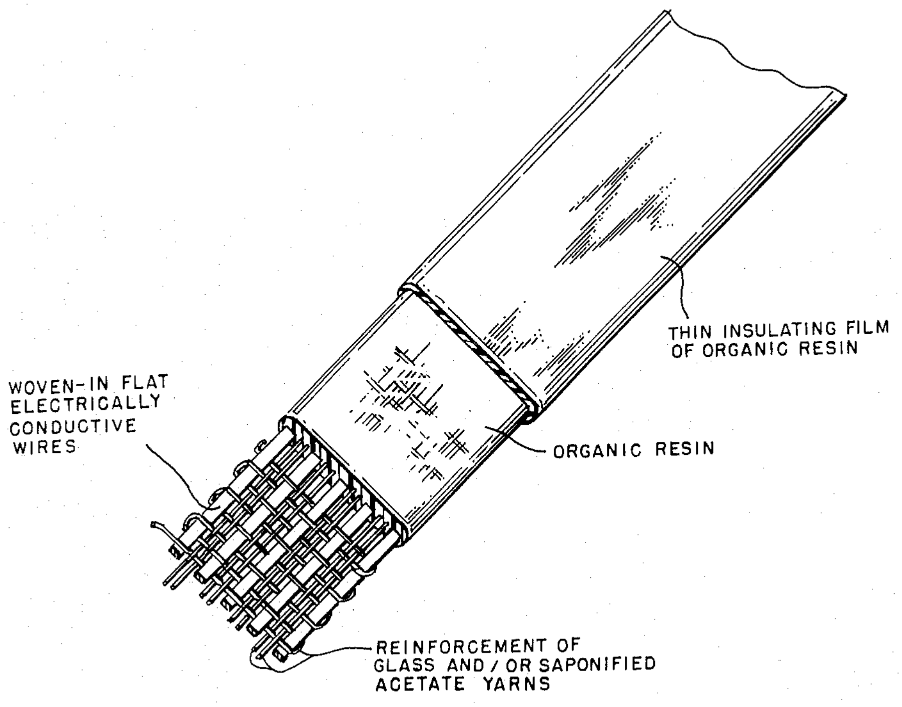
INVENTORS,
ADOLPHE RUSCH JR.
GERARD J. REILLY
BY: Harry M. Saragovitz,
Edward J. Kelly,
Herbert Berl &
Julian C. Keppler ATTORNEYS.

United States Patent Office 3,257,500

Patented June 21, 1966

3,257,500

FLAT ELECTRICALLY CONDUCTIVE FLEXIBLE CABLE

Adolphe Rusch, Jr., Rumson, and Gerard J. Reilly, Port Monmouth, N.J., assignors to the United States of America as represented by the Secretary of the Army Filed June 3, 1964, Ser. No. 372,435
4 Claims. (Cl. 174—116)

The invention described herein may be manufactured and used by or for the Government for governmental purposes without the payment of any royalty thereon.

This invention relates to electrically conductive cables and more particularly to an improved flat electrically conductive flexible cable.

The flat electrically conductive flexible cables presently in use consist of spaced parallel flat electrically conductive wires, for example, copper wires, laminated between two unsupported plastic films using a thermoplastic organic resin as the bonding agent. These cables suffer from delamination under flexing and exposure to heat, poor dimensional stability, shrinkage of the overlay or supporting films, and non-critical wire spacing. The latter causes a shifting of the electrically conductive wires within the laminate which in turn, causes poor registration of the cable wires with the connector pins.

The general object of this invention is to provide an improved flat electrically conductive flexible cable in which the aforementioned difficulties are overcome. More specifically, it is the object of this invention to provide a flat electrically conductive flexible cable having high dimensional stability and no tendency to delaminate when subjected to flexing and environmental extremes and further having critical wire spacing so that there will be good registration of the cable wires with connector pins.

It has been found that the aforementioned objectives can be obtained by providing a flat electrically conductive flexible cable composed of a fabric containing either glass, asbestos, or saponified acetate yarns in which flat electrically conductive wires are woven into the material in such a manner that each conductive wire is separated from the next conductive wire by a specified number of woven threads maintaining critical position alignment and dimensional stability of the electrically conductive wires. After being woven, the fabric containing the conductive wires is mechanically impregnated and calendered with a suitable organic resin such as a polycarbonate resin which results in a reinforced resin fabric containing evenly spaced flat electrically conductive wires. This reinforced fabric is characterized by high dimensional stability and critical wire spacing. The reinforced resin impregnated fabric is then laminated under heat and pressure between two unsupported resin films, which act as insulating films. Thus, the insulating thickness can be accurately controlled by varying the thickness of the resin films; and due to the fact that the fabric has been impregnated with the same organic resin of which the laminated films are composed, a homogeneous bond is obtained which prevents any delamination in subsequent use.

The flat electrically conductive flexible cable of the invention can be illustrated by the accompanying drawing wherein a plan cutaway view of the flat electrically conductive flexible cable is shown containing word legends to the three sections shown. The left section of the drawing shows the woven fabric containing the woven-in flat electrically conductive wires. The center section of the drawing illustrates the same material impregnated with an organic resin. The right section of the drawing illustrates the resin impregnated fabric having homogeneously bonded insulating films on both sides of the fabric.

This fabric is usually woven by means of two separate beams. One of the beams is composed of either glass, asbestos, or saponified acetate yarn. The second beam contains flat electrically conductive wires, for example, flat copper wires. The material is usually woven plain weave in such a manner that the flat electrically conductive wires are woven into the material and firmly bonded between one or more threads to maintain high precision wire spacing and dimensional stability. A particular fabric that has been prepared according to the invention is composed of 450 glass yarn having 128 ends to the inch woven plain weave with approximately 24 to 72 picks of the same filling material as that of which the warp is composed. The flat electrically conductive wires that are woven into this material are flat copper wires 0.002 inch by 0.025 inch.

The fabric containing the flat electrically conductive wires is impregnated with an organic resin from solution by a continuous process. This is accomplished by passing the fabric through a bath containing an organic resin in a suitable solvent or by applying the resin solution to the fabric by means of gravure, machined, or etched rollers. The fabric thus impregnated with resin is then passed through heated chambers or subjected to hot air blowing in order to drive off the solvents. It is then calendered to obtain the desired thickness and surface smoothness.

Particularly desirable organic resins that can be used for impregnating the fabric are the polycarbonate resins which are polymers of diesters of carbonic acid. They can be represented by the general formula $$[\mathrm{R{-}O\overset{\displaystyle O}{\overset{\|}{C}}{-}OR}]_n$$

wherein R is at least a difunctional organic radical as for example, the bisphenol A radical. A convenient impregnating and laminating solution that can be used with polycarbonate resin is made from 78 parts by weight of methylene chloride, 8.7 parts by weight of tetrachloroethane, and 13.3 parts by weight of polycarbonate resin.

The impregnated fabric is subsequently laminated under heat and pressure between two unsupported organic resin films of the same material as the impregnating resin (sandwich construction), which act as insulating films.

The foregoing description is to be considered merely as illustrative of the invention and not in limitation thereof.

What is claimed is:

1. A flat electrically conductive flexible cable comprising a fabric selected from the group consisting of glass, asbestos, and saponified acetate yarns, flat electrically conductive wires woven into said fabric in such a manner that each electrically conductive wire is spaced from the adjacent conductive wire by a specified number of threads to maintain high precision wire spacing, said fabric being impregnated with an organic resin and homogeneously bonded on both sides to a thin insulating film of the same material as the impregnating resin.

2. A flat electrically conductive flexible cable according to claim 1 wherein the woven-in flat electrically conductive wires are copper wires.

3. A flat electrically conductive flexible cable according to claim 1 wherein the organic resin is a polycarbonate resin.

4. A flat electrically conductive flexible cable according to claim 1 wherein the woven-in flat electrically conductive wires are copper wires and the organic resin is a polycarbonate resin.

(References on following page)

References Cited by the Examiner

UNITED STATES PATENTS

| | | | |
|---|---|---|---|
| 1,012,030 | 11/1908 | Underwood | 174—117 |
| 3,197,555 | 4/1962 | Mittler | 174—117 |

FOREIGN PATENTS

| | | |
|---|---|---|
| 233,050 | 5/1925 | Great Britain. |

OTHER REFERENCES

The Condensed Chemical Dictionary, New York, Reinhold, 1962 (p. 910 relied on).

LARAMIE E. ASKIN, *Primary Examiner.*

JOHN F. BURNS, *Examiner.*

H. HUBERFELD, *Assistant Examiner.*